US007370633B2

(12) United States Patent
Kang et al.

(10) Patent No.: US 7,370,633 B2
(45) Date of Patent: May 13, 2008

(54) LOAD TRANSIENT CONTROL METHODS FOR DIRECT-INJECTION ENGINES WITH CONTROLLED AUTO-IGNITION COMBUSTION

(75) Inventors: Jun-Mo Kang, Ann Arbor, MI (US); Chen-Fang Chang, Troy, MI (US); Zongxuan Sun, Troy, MI (US); Tang-Wei Kuo, Troy, MI (US); James A. Eng, Troy, MI (US); Barry L. Brown, Lake Orion, MI (US); Paul M. Najt, Bloomfield Hills, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 7 days.

(21) Appl. No.: 11/366,217

(22) Filed: Mar. 2, 2006

(65) Prior Publication Data
US 2006/0196467 A1  Sep. 7, 2006

Related U.S. Application Data

(60) Provisional application No. 60/658,376, filed on Mar. 3, 2005.

(51) Int. Cl.
*F02B 47/08* (2006.01)
*F02M 51/00* (2006.01)

(52) U.S. Cl. .................. 123/305; 123/568.14

(58) Field of Classification Search ............... 123/299, 123/305, 90.15, 568.11, 568.14, 443, 436, 123/295, 492

See application file for complete search history.

(56) References Cited

U.S. PATENT DOCUMENTS 4,446,830 A   5/1984   Simko et al.

(Continued)

FOREIGN PATENT DOCUMENTS

WO   WO 01/46571   6/2001

(Continued)

OTHER PUBLICATIONS

SAE Tech Paper Series ™980495, "Fuel Injection Strategies to Increase Full-Load Torque Output of a Direct-Injection SI Engine", Yang and Anderson; Feb. 23-26, 1998.

(Continued)

*Primary Examiner*—Hai Huynh

(57) ABSTRACT

A direct injection controlled auto-ignition engine is operated at steady state, within a homogeneous charge compression-ignition (HCCI) load range and with fuel-air-diluent mixtures at predetermined conditions, for each speed and load, of engine control inputs, including at least fueling mass flow rate, injection timing (FI), spark timing (SI) and exhaust recompression obtained by negative valve overlap (NVO). During load change rates below a predetermined threshold, SI, FI and NVO change rates are synchronized to current changes in the fueling mass flow rate. For fast load increases above the threshold, the cylinder charge is temporarily enriched by increasing the percentage of residual gas or reducing the percentage of fresh air mass in the charge sufficiently to maintain auto-ignition temperature during the load change. This may be done by delaying NVO action for a predetermined speed-dependent number of engine cycles. At very low loads, stable fuel rate reduction may require an alternate method involving deceleration fuel cut-off followed by a step change during refire.

20 Claims, 14 Drawing Sheets

U.S. PATENT DOCUMENTS

| | | |
|---|---|---|
| 5,713,328 A | 2/1998 | Anderson et al. |
| 5,746,182 A | 5/1998 | Nada |
| 6,082,342 A | 7/2000 | Duret et al. |
| 6,155,217 A | 12/2000 | Shiraishi et al. |
| 6,267,097 B1 | 7/2001 | Urushihara et al. .......... 123/305 |
| 6,286,478 B1 | 9/2001 | Atago et al. |
| 6,336,436 B1 | 1/2002 | Miyakubo et al. |
| 6,386,177 B2 | 5/2002 | Urushihara et al. |
| 6,497,213 B2 | 12/2002 | Yoshizawa et al. |
| 6,619,255 B2 | 9/2003 | Urushihara et al. |
| 6,622,689 B2 * | 9/2003 | Hasegawa et al. .......... 123/294 |
| 6,636,197 B1 | 10/2003 | Goldenberg et al. |
| 6,640,771 B2 | 11/2003 | Fuerhapter ................. 123/295 |
| 6,651,616 B1 * | 11/2003 | Juretzka et al. ............. 123/305 |
| 6,807,937 B2 | 10/2004 | Gianolio et al. ............ 123/308 |
| 6,895,912 B2 | 5/2005 | Saruwatari et al. ...... 123/90.15 |
| 7,004,116 B2 * | 2/2006 | Allen ....................... 123/27 R |
| 7,017,561 B1 | 3/2006 | Liu et al. ............... 123/568.12 |
| 7,021,277 B2 * | 4/2006 | Kuo et al. .................. 123/299 |
| 7,089,912 B2 * | 8/2006 | Koopmans ............ 123/406.45 |
| 7,128,047 B2 * | 10/2006 | Kuo et al. .................. 123/299 |
| 7,171,957 B2 | 2/2007 | Liu et al. ............... 123/568.12 |
| 7,194,996 B2 | 3/2007 | Koopmans ................. 123/295 |
| 2004/0134449 A1 | 7/2004 | Yang |
| 2004/0173180 A1 | 9/2004 | Strom et al. |
| 2004/0182359 A1 | 9/2004 | Stewart et al. |
| 2006/0016421 A1 | 1/2006 | Kuo et al. |
| 2006/0016422 A1 | 1/2006 | Kuo et al. |
| 2006/0016423 A1 | 1/2006 | Kuo et al. |
| 2006/0196466 A1 | 9/2006 | Kuo et al. .................. 123/295 |
| 2006/0196467 A1 | 9/2006 | Kang et al. ................ 123/305 |
| 2006/0196468 A1 | 9/2006 | Chang et al. ............... 123/305 |
| 2006/0196469 A1 | 9/2006 | Kuo et al. .................. 123/305 |
| 2006/0243241 A1 * | 11/2006 | Kuo et al. .................. 123/295 |

FOREIGN PATENT DOCUMENTS

| | | |
|---|---|---|
| WO | WO 01/46572 | 6/2001 |
| WO | WO 01/46573 | 6/2001 |

OTHER PUBLICATIONS

U.S. Appl. No. 11/367,045, filed Mar. 2, 2006, Kuo et al.
U.S. Appl. No. 11/367,050, filed Mar. 2, 2006, Kuo et al.
U.S. Appl. No. 11/367,047, filed Mar. 2, 2006, Chang et al.

* cited by examiner

LOAD TRANSIENT CONTROL METHODS FOR DIRECT-INJECTION ENGINES WITH CONTROLLED AUTO-IGNITION COMBUSTION

CROSS-REFERENCE TO RELATED APPLICATIONS

This application claims priority from U.S. Provisional Patent Application No. 60/658,376 filed Mar. 3, 2005.

TECHNICAL FIELD

This invention relates to controlled auto-ignition internal combustion engines. More particularly, the invention is concerned with stability in load transitions in such engines.

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air and fuel is created and auto-ignited simultaneously from many ignition sites within the mixture during compression, resulting in very stable power output and high thermal efficiency. Since the combustion is highly diluted and uniformly distributed throughout the charge, the burned gas temperature, and hence NOx emission, is substantially lower than that of the traditional spark ignition engine based on propagating flame front, and the diesel engine based on an attached diffusion flame. In both spark ignition and diesel engines, the burned gas temperature is highly heterogeneous within the mixture with very high local temperature creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e. the residual content, within the two-stroke engine combustion chamber is responsible for providing the high mixture temperature necessary to promote auto-ignition in a highly diluted mixture. In four-stroke engines with traditional valve means, the residual content is low, controlled auto-ignition at part load is difficult to achieve. Known methods to induce controlled auto-ignition at part load include: 1) intake air heating, 2) variable compression ratio, and 3) blending gasoline with fuel that has wider auto-ignition ranges than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation to obtain the necessary conditions for auto-ignition in a highly diluted mixture. Various fueling controls including split and single injections have been proposed for use in conjunction with valve control strategies to maintain stable auto-ignition combustion across a variety of engine load conditions.

In commonly assigned U.S. patent application Ser. No. 10/899,457 an exemplary fuel injection and valve strategy for stable, extended controlled auto-ignition is disclosed. Therein, during operation at low load, a first injection of fixed amount of fuel during the negative valve overlap period is followed by a second fuel injection during the subsequent compression stroke. The injection timing for the first injection retards and the injection timing for the second injection advances in a continuous manner as the engine load increases. During operation with intermediate part load, a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. And, during operation with high part load, a single fuel injection during the intake stroke supports auto-ignition. The injection timing retards as the engine load increases.

While the advances outlined above have successfully demonstrated controlled auto-ignition capabilities at steady state conditions, rapid load changes or transients may introduce undesirable combustion results.

SUMMARY OF THE INVENTION

In a controlled auto-ignition engine, combustion phasing is strongly affected by charge temperature, e.g., high charge temperature advances combustion phasing and may result in knocking, while low charge temperature retards combustion phasing and may result in partial-burn or misfire. The present invention provides a system and method for robust auto-ignition combustion control from low to high part load (and vice versa) during rapid load transients. Using various combinations of injection and valve strategies, stable controlled auto-ignition combustion is maintained during load transients with the present invention.

At low loads, the engine is operated unthrottled with lean fuel/air ratios and controlled auto-ignition, using exhaust recompression for controlling combustion temperatures. At high part load, stoichiometric operation is required for NOx emission control, so throttled operation and exhaust gas recirculation (EGR) are added with external exhaust recirculation for combustion temperature control. Steady state combustion conditions obtained from lookup tables are used for steady state operation at various loads and speeds.

In HCCI operation, rapid load changes from low to high part load and back to low load may be accomplished without excessive combustion phasing variations by synchronizing fuel injection timing (FI), spark timing (SI) and negative valve overlap (NVO) to the changes in the current fueling mass flow rate. However, rapid load changes exceeding a predetermined threshold require, for load increases, that NVO reductions be retarded by a speed dependent number of engine cycles to maintain adequate gas temperatures in the cylinders to avoid misfires.

In stoichiometric operation at higher loads, throttle position and external EGR are added to NVO for combustion temperature control. Where necessary, during rapid load changes, a higher percentage of residual exhaust gas and/or a lower percentage of fresh air mass is required to maintain an adequate auto-ignition temperature. This may be accomplished by throttle, EGR or NVO adjustments.

A feed forward control is provided with which control inputs to the engine, including spark timing, fuel injection timings, and valve timing, are set equal to steady state inputs corresponding to the current fueling rate. Pre-calibrated steady state inputs are stored in look up tables, and inputs to the engine are determined by interpolating values of steady state inputs in the look up tables based on the current fueling rate.

These and other features and advantages of the invention will be more fully understood from the following description of certain specific embodiments of the invention taken together with the accompanying drawings.

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engines. A four-stroke, single cylinder, 0.55 liter, internal combustion engine was utilized in implementing the various controls and acquisition of the various data embodied herein. Unless specifically discussed otherwise, all such implementations and acquisitions are assumed to be carried out under standard conditions as understood by one having ordinary skill in the art. The present invention is described in its application to a two valves per cylinder engine (one intake and one exhaust valve), although it should be appreciated that the present invention is equally applicable to a multi-valve per cylinder engine. And, although the present invention is applicable to any variable valve actuation (VVA) strategy using either a fully flexible electro-hydraulic or an electro-mechanical system, the example used below to illustrate our control strategy is based on a two-step with dual cam phasing VVA system.

Figure 1:
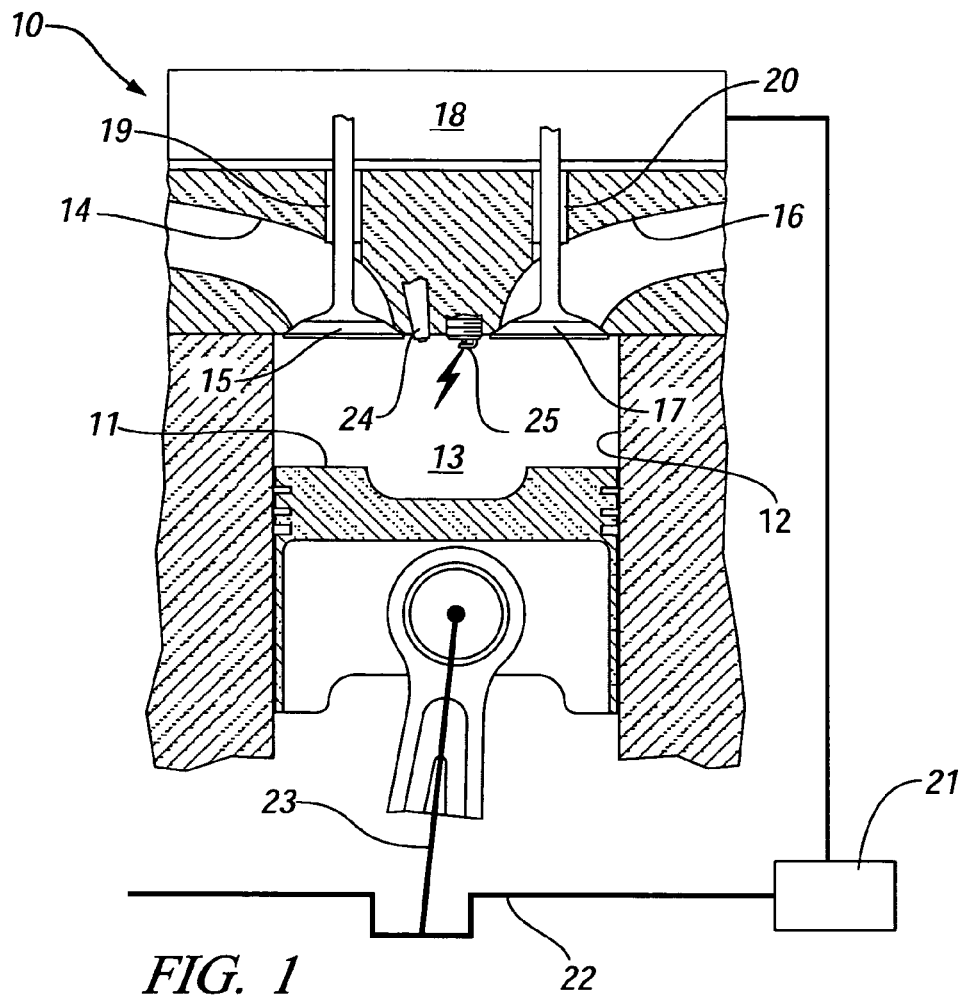
FIG. 1 is a schematic illustration of a single cylinder gasoline direct-injection four-stroke internal combustion engine capable of being operated according to the present invention.

Referring first to FIG. 1 of the drawings in detail, numeral 10 generally indicates a schematic representation of an exemplary single-cylinder direct-injection four-stroke internal combustion engine. In the figure, a piston 11 is movable in a cylinder 12 and defines with the cylinder 12 a variable volume combustion chamber 13. An intake passage 14 supplies air into the combustion chamber 13. Air flow into the combustion chamber 13 is controlled by an intake valve 15. Combusted gases can flow from the combustion chamber 13 via an exhaust passage 16, controlled by an exhaust valve 17.

Exemplary engine 10 has a hydraulically controlled valve train with an electronic controller 18, which is programmable and hydraulically controls the opening and closing of both the intake 15 and exhaust 17 valves. The electronic controller 18 will control the movement of the intake valve 15 and exhaust valve 17 having regard to the positions of the intake and exhaust valves 15 and 17 as measured by two position transducers 19 and 20. The controller 18 will also refer to the angular position of the engine, as indicated by a rotation sensor 21 connected to the engine crankshaft 22. The crankshaft 22 is connected by a connecting rod 23 to the piston 11 reciprocating in the cylinder 12. A gasoline direct injector 24, controlled by the electronic controller 18, is used to inject fuel directly into the combustion chamber 13. The various functions ascribed to the controller 18 may equally well be performed by a plurality of separate but coordinated controllers adapted for the various tasks.

A spark plug 25, controlled also by the electronic controller 18, is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

Figure 2:
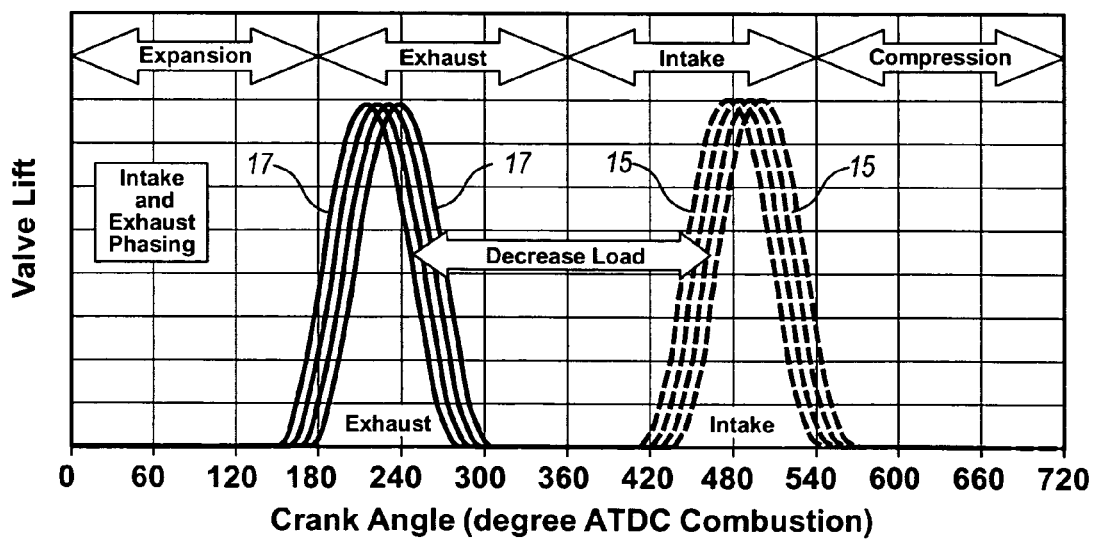
FIG. 2 is a graph of valve lift vs. crank angle for the phasing of exhaust and intake valves of a four-stroke internal combustion engine operating at different loads according to exemplary controlled auto-ignition control using two-step variable valve actuation with dual cam phasing.

FIG. 2 illustrates the control motions of the intake valve 15 and exhaust valve 17 wherein the valve lift profiles are shown as a function of crank angle for the exhaust 17 and intake 15 valves of the four-stroke internal combustion engine operating with exemplary controlled auto-ignition (HCCI combustion) controls.

Motion of the exhaust valve is shown by the solid lines 17 and motion of the intake valve is indicated by the dashed lines 15. The exhaust valve 17 closes early, at a variable angle before the exhaust/intake top dead center (TDC 360 degrees) and the intake valve 15 opens late, preferably at an equal angle after TDC. The interim period when both valves are closed is referred to as negative valve overlap (NVO). The paired exhaust/intake valve profiles 17, 15, ranging from the pair closest together to the pair furthest apart represent increasing NVO with decreasing engine loads (NMEP) of, sequentially, 350, 285, 215 and 144 kPa. This valve motion can be achieved using a dual cam phasing system, or by any other devices that can generate such valve profiles.

With this strategy, the negative valve overlap (NVO) is varied by phasing of both intake and exhaust lift profiles simultaneously. It is experimentally confirmed that for maintaining optimal auto-ignition combustion throughout the load range, the required negative valve overlap period increases linearly with decreasing engine load, which relationship is illustrated in FIG. 2.

Figure 3A:
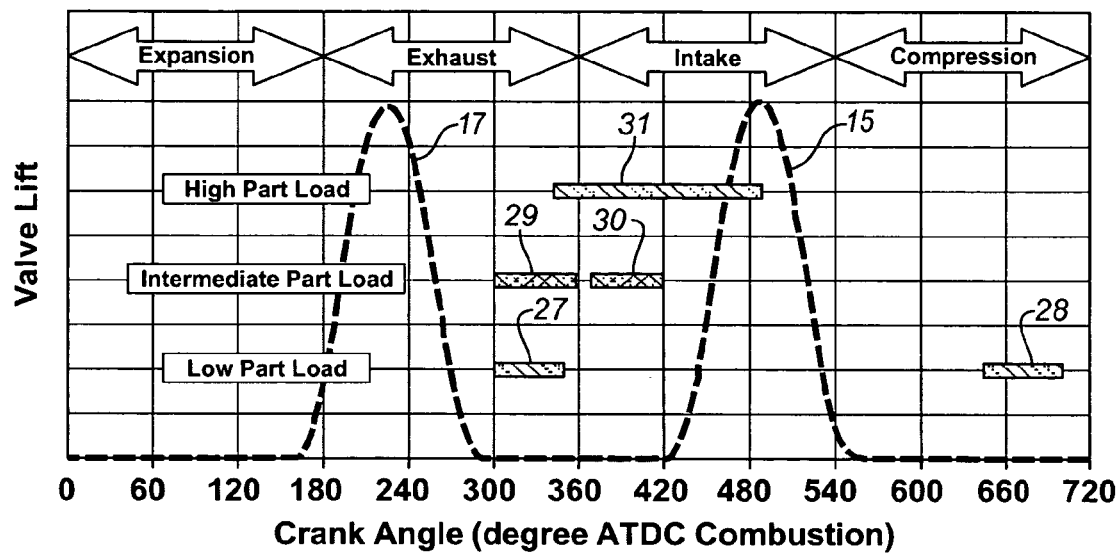
FIG. 3A is a graph of typical intake and exhaust valve events vs. crank angle with exemplary controlled auto-ignition injection strategies for engine operation with low, intermediate, and high part loads, respectively.

FIG. 3A shows exemplary injection strategies during engine operation with low, intermediate, and high part loads, respectively. Also shown in FIG. 3A are exemplary intake and exhaust valve events and, in FIG. 3B is shown in-cylinder pressure history in accordance with such exemplary valve events.

During operation with low part load, the fuel injector is activated twice during a single engine cycle as indicated by spaced bars 27, 28. The first injection 27, between about 300 and 350 degrees ATDC combustion, sprays a fixed amount of gasoline or equivalent fuel into the high temperature and pressure exhaust gas trapped in the cylinder during the negative valve overlap period. The injection timing for the first injection is retarded in a continuous manner as the engine load increases. The fuel is partially oxidized and converted to more reactive chemical species and energy is released. The amount of the more reactive chemical species and energy varies with the quantity and timing of fuel injected in the first injection and the negative valve overlap (NVO) period.

Figure 3B:
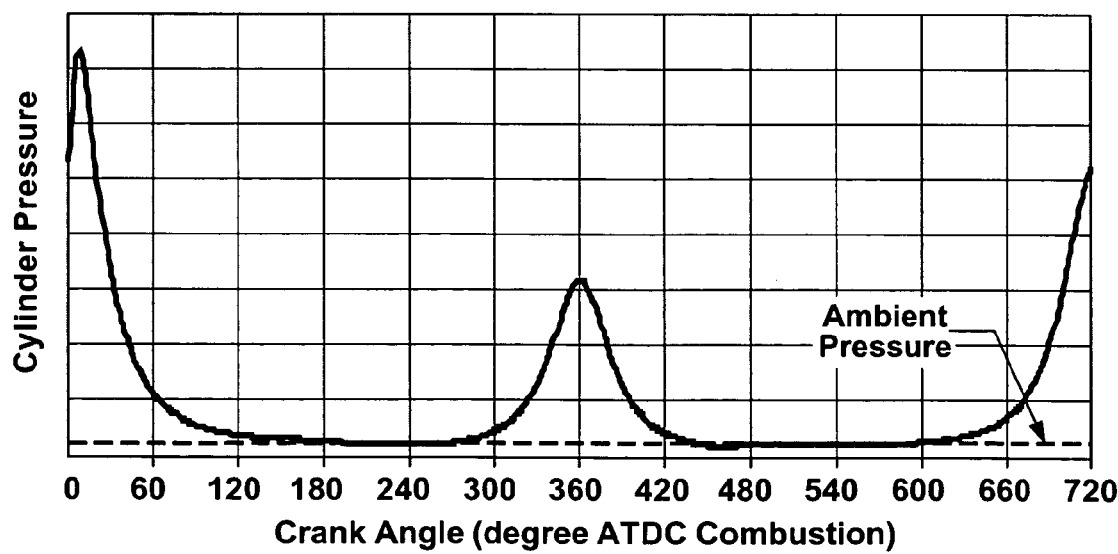
FIG. 3B is a graph of a typical in-cylinder pressure history vs. crank angle for exemplary controlled auto-ignition exhaust recompression valve strategy.

As shown in FIG. 3B, the trapped gases are first compressed in the NVO period toward the end of the exhaust stroke between about 300 and 360 degrees ATDC, after the exhaust valve closes. The compressed fuel and exhaust gas mixture is then expanded during the early part of the intake stroke when both the intake and exhaust valves are closed. The cylinder pressure drops to around the ambient pressure at which time the intake valve opens to induct fresh air into the combustion chamber. During the compression stroke, the fuel injector is activated again at 28 for a second injection of gasoline into the combustion chamber between 60 and 20 degrees BTDC combustion. This injection timing is chosen to ensure smoke-free operation and is affected by either the injector spray cone angle or the amount of fuel injected.

The injection timing for the second injection is advanced in a continuous manner as the engine load increases. Penetration and dispersion of the fuel spray are suppressed due to higher in-cylinder charge temperature and density. A localized rich mixture region is formed in the combustion chamber. The species formed by gasoline reforming after the first fuel injection works in conjunction with the localized rich mixture formed by the second fuel injection to accomplish the auto-ignition of gasoline under a relatively low compression ratio without any help of spark, as compared to a relatively high compression ratio used in a diesel engine.

During operation with intermediate part load, the fuel injector is also activated twice during a single engine cycle as shown by adjacent bars 29, 30. The first injection 29 sprays gasoline into the combustion chamber between about 300 and 360 degrees ATDC combustion, similar to that used in the operation with low part load. The second injection 30, however, starts about 30 to 60 degrees after the end of the first injection. Both injections are performed during the negative valve overlap period and subsequent intake stroke. The injection timings of both injections are retarded in a continuous manner as the engine load increases. The objective is to use split injection for controlling gasoline reform, and thus the auto-ignition process. For both low and intermediate part load operations, 1-3 mg of fuel is sufficient for the first injection 29. The remaining fuel is injected during the second injection 30.

During operation with high part load, the fuel injector is activated only once during a single engine cycle, as shown by bar 31. The injection timing varies between 340 and 490 degrees ATDC combustion depending on the engine load. The injection timing is retarded as the engine load increases.

Transition from one injection strategy to another during load change is regulated to benefit both engine performance and emissions. For example, during operation with low part load, split injection—with the first injection 27 during the negative valve overlap period and the second injection 28 during the compression stroke—is the only injection strategy that has proved capable of generating stable controlled auto-ignition combustion. The injection timing for the second injection 28 is advanced continuously with increasing engine load to promote dispersion of fuel within the cylinder content and to keep the air/fuel ratio of the localized mixture within an acceptable range to avoid excessive emissions of NOx and smoke.

However, even with the advanced injection timing, formation of nitrogen oxides (NOx) can still rise to unacceptable levels during operation at intermediate part load. Thus, with intermediate part load, the injection timing of the second fuel injection 30 is switched from the compression stroke to the intake stroke as shown in FIG. 3A. It is confirmed experimentally that both strategies result in similar engine performance. Although the NOx emission can be greatly reduced with the second fuel injection 30 during the intake stroke, the HC emission increases due to an increase in the crevice-trapped fuel that escapes combustion. The exact load where the transition takes place will be determined by emissions tradeoff.

Figure 4:
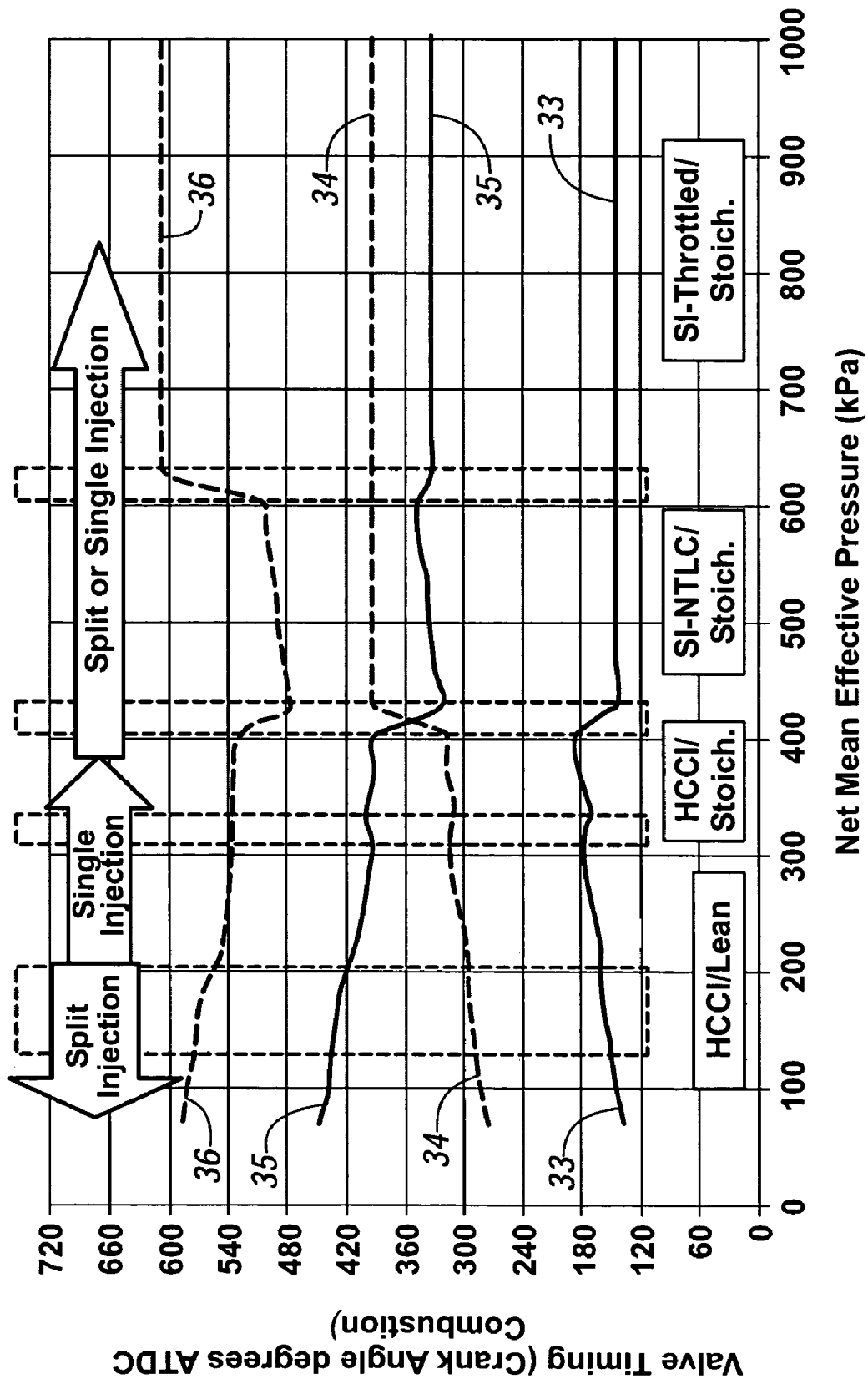
FIG. 4 is a graph of exemplary overall operating strategy vs. engine load for exhaust and intake valves, fuel injection and operation mode for a single cylinder four-stroke internal combustion engine operating according to exemplary controlled auto-ignition controls using a two-step with dual cam phasing variable valve actuation system.

FIG. 4 shows exemplary opening and closing valve timings as a function of engine load for the exhaust and intake valves of a single cylinder four-stroke internal combustion engine operating at a constant speed. The valve control exemplifies exhaust recompression using a two-step with dual cam phasing VVA system. Exhaust valve openings over the load range (NMEP) are shown by a solid line 33 and exhaust valve closings by a dashed line 34. Intake valve openings are shown by a solid line 35 and intake valve closings by a dashed line 36. Also shown in FIG. 4 are the injection strategy (split vs. single) and various combustion modes as a function of engine load at an exemplary constant speed.

In particular, the engine is operated in the controlled auto-ignition combustion mode with lean air/fuel mixture (HCCI/Lean) below 320 kPa NMEP. During this combustion mode, the NOx emission index increases with increasing engine load. At 320 kPa NMEP, the NOx emission index is around 1 g/kg fuel. Accordingly, between 320 and 400 kPa NMEP, the engine is operated in the controlled auto-ignition combustion mode with stoichiometric air/fuel ratio (HCCI/Stoich.) to allow the use of a traditional after treatment device for NOx control. Split injection may be used in the higher load portion of this mode to limit the maximum rate of cylinder pressure rise.

Between 400 and 600 kPa NMEP, the engine is operated in a spark-ignition, non-throttled stoichiometric mode with load controlled by VVA strategies such as early intake valve closing (SI-NTLC/Stoich, as shown) or late intake valve closing. Beyond 600 kPa NMEP, the engine is operated in a traditional spark-ignition and throttled combustion mode with stoichiometric air/fuel mixture (SI-Throttled/Stoich) until reaching full load. Split injection may be utilized in either of the latter two modes in order to limit the maximum rate of cylinder pressure rise.

In a controlled auto-ignition engine, combustion phasing is strongly affected by charge temperature, e.g., higher charge temperatures advance combustion phasing and may result in knocking, while lower charge temperatures retard combustion phasing and may result in partial-burn or misfire. Using various combinations of injection and valve strategies, stable controlled auto-ignition combustion is maintained during low to high part load transients (and vice-versa) with the present invention.

Figure 5:
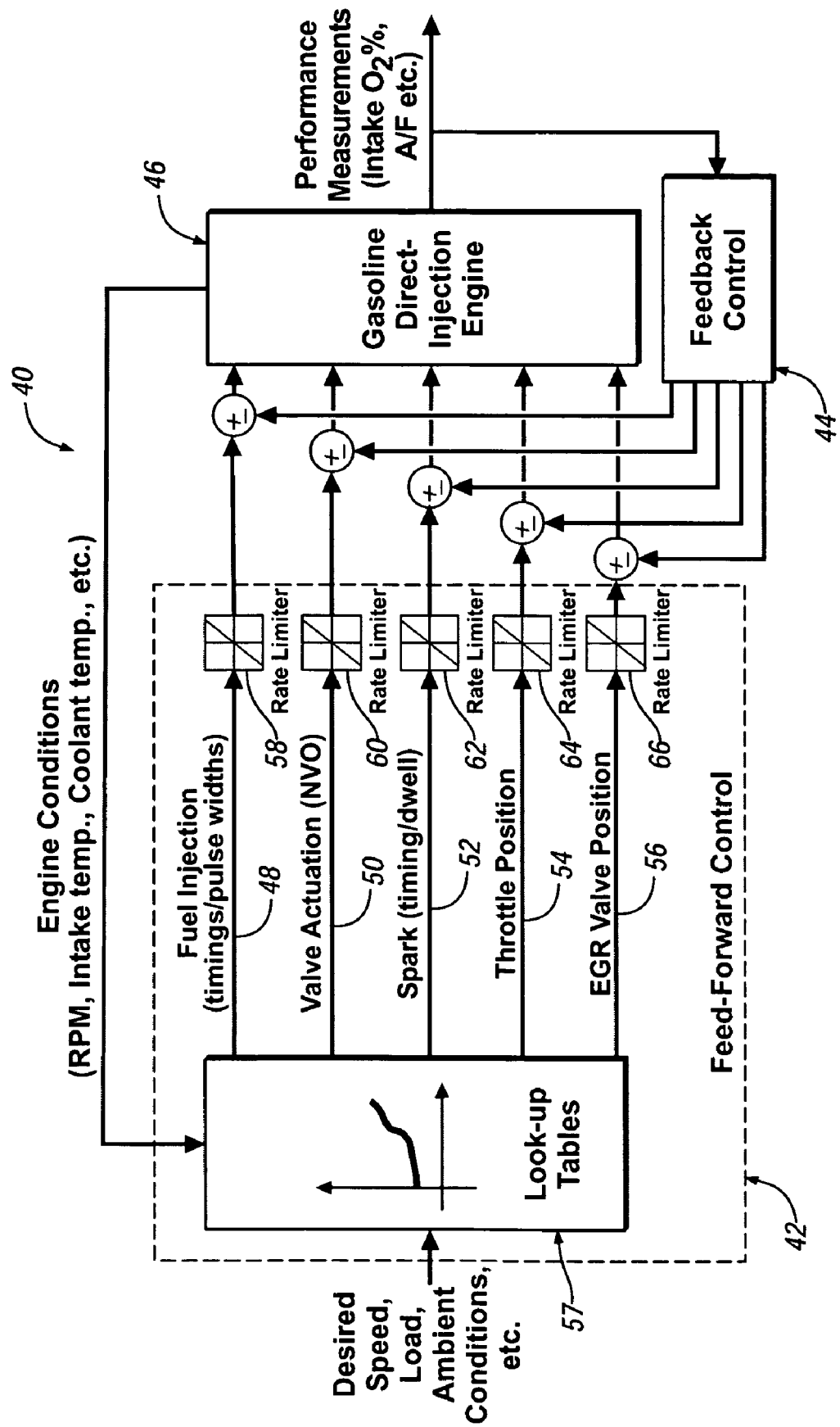
FIG. 5 is a diagrammatic view of an exemplary controller with which robust controlled auto-ignition combustion is maintained during various load transients in accordance with the present invention.

FIG. 5 shows a schematic diagram of an engine controller 40, according to the invention, with which robust controlled auto-ignition combustion is achieved during load transients. The controller 40 includes a feed forward control 42 and a feedback control 44, connected with associated components of a representative gasoline direct-injection engine 46.

The feed forward control 42 achieves a fast system response. Based on the desired load and engine operating mode conditions, required fuel injection timings (FI) and pulse widths (fueling rate) 48, valve actuation (including negative valve overlap (NVO)) 50, spark timing (SI) 52, throttle position 54, and EGR valve position 56 are calculated from look-up tables 57 to control the combustion phasing. Also, depending on the current engine operating conditions and driver's load demand, variable rate limiters 58, 60, 62, 64, 66 are used to compensate different dynamics in the system, e.g., air and fuel dynamics, as will be discussed later in detail.

As will be shown later, robust controlled auto-ignition combustion is maintained during severe load transients using only the feed forward control 42 with calibrated look-up tables. Although not being emphasized here, the feedback control is used to further enhance the overall system robustness.

In general operation of the feed forward control 42 during rapid load transients with HCCI (homogenous charge compression ignition) engine operation, inputs to the engine, including at least spark timing (SI), fuel injection timing (FI) and valve timing (and, where used, throttle position and EGR valve position) are set equal to (i.e. synchronized with) steady state inputs corresponding to the current mass flow fueling rate (fueling rate). Pre-calibrated steady state inputs are stored in the look-up tables 42, and the engine inputs are determined by interpolating values of steady state inputs in the look-up tables.

Figure 6:
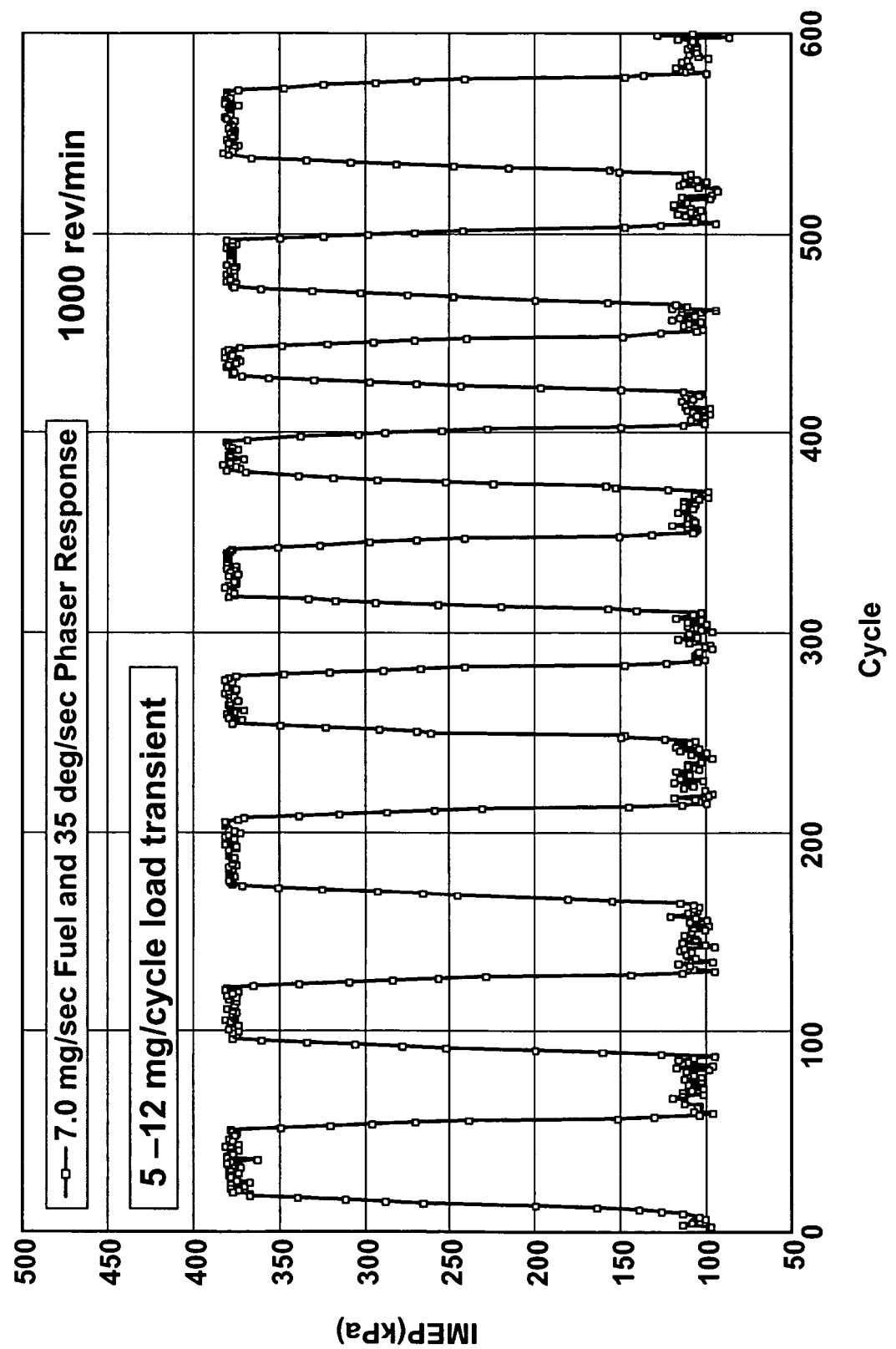
FIG. 6 is a graph of measured Indicated Mean Effective Pressure (IMEP) vs. engine cycles during a rapidly varying load transient from 5 to 12 mg/cycle with 7 mg/sec fuel and 35 deg/sec phaser change rates.

FIG. 6 shows the results of tests with the present feed forward control applied to load transients with the fueling rate repeatedly changing from 5 mg/cycle to 12 mg/cycle, and vice versa. The rate of fueling changing was set to 7 mg/sec, cam phaser response was 35 deg/sec and intake manifold temperature was regulated at 90 degrees C. during the test. The figure shows that the feed forward control achieves controlled auto-ignition (CAI) combustion without a misfire during rapid load transients.

Figure 7:
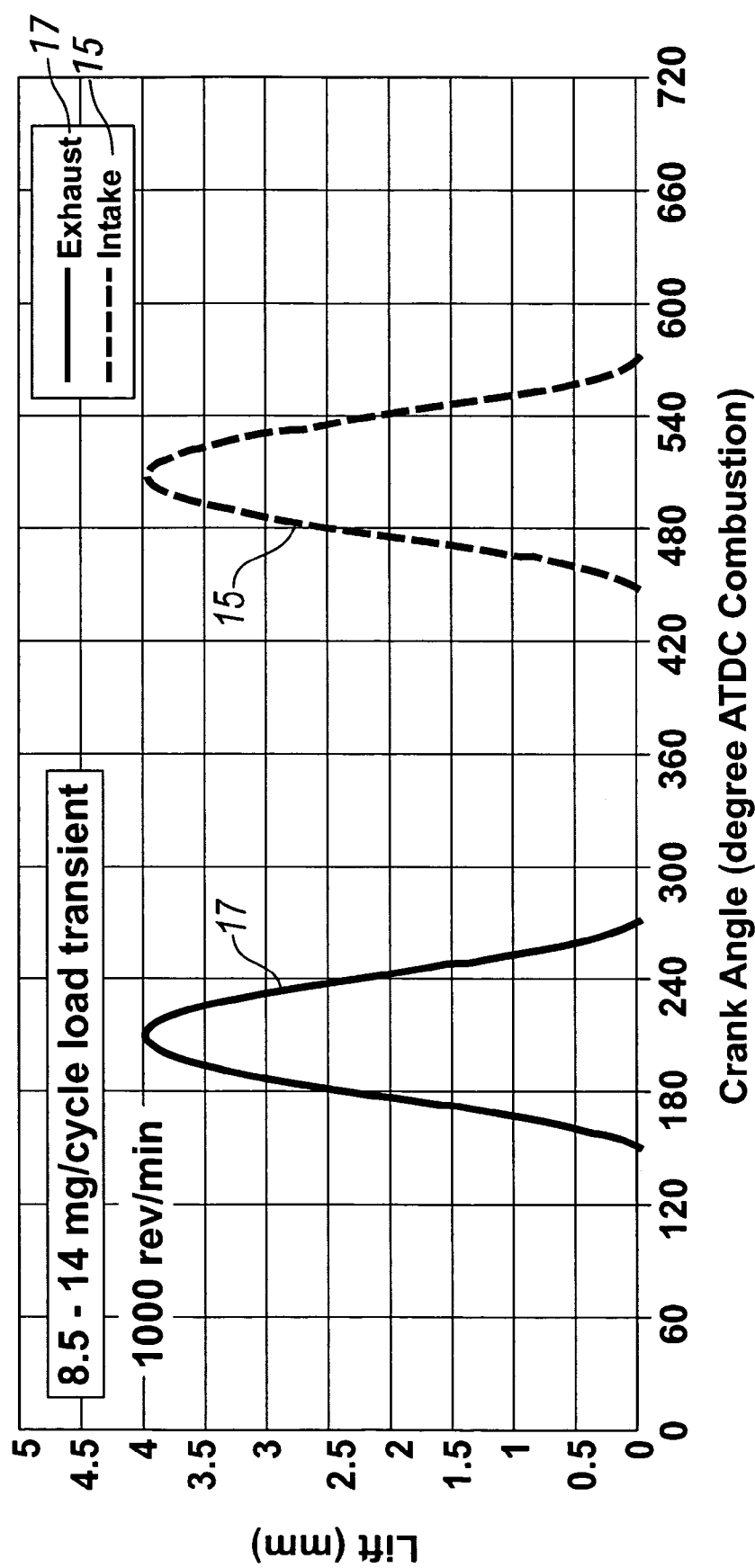
FIG. 7 is a graph of the valve lift profiles used for an 8.5-14 mg/cycle load transient test under room temperature intake air, oil, and coolant temperatures.
Figure 8:
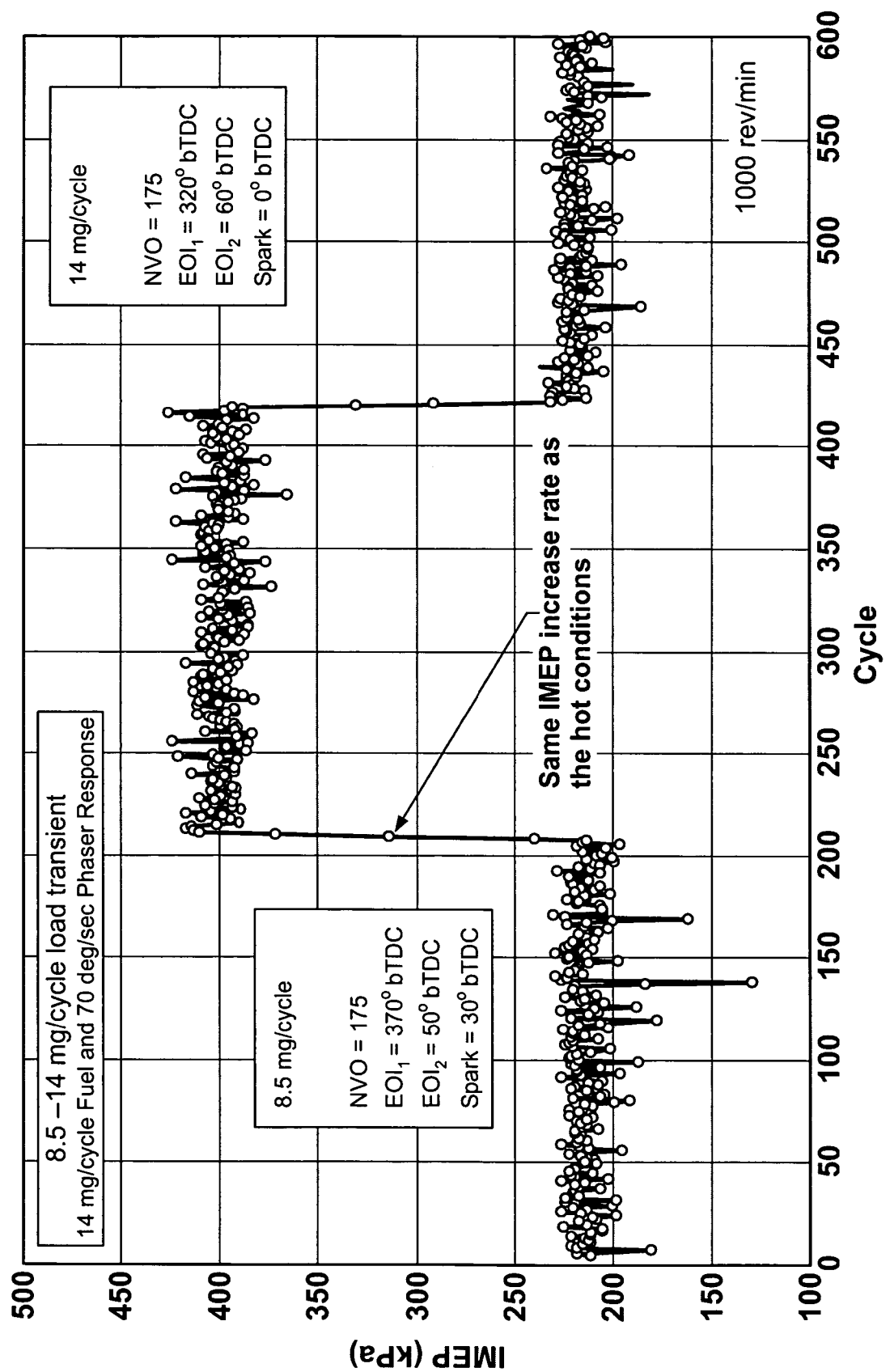
FIG. 8 is a graph of the measured IMEP vs. engine cycles during a room temperature load transient test with 14 mg/sec fuel and 70 deg/sec phaser change rates.

The foregoing example shows that, with the present invention, CAI combustion is quite robust during load transients under fully warmed-up engine operating conditions. FIG. 7 shows the lift profiles for exhaust and intake valves used for load transient tests between 8.5 and 14 mg/cycle under a room temperature intake air, oil and coolant environment. The lift profile remains the same during the load transient. FIG. 8 shows the measured IMEP during this room temperature load transient. The fueling rate change was set for 14 mg/sec and cam phaser response was set for 70 deg/sec. Smooth load transition is clearly demonstrated.

It has thus been demonstrated that the feed forward control can maintain CAI combustion during load transients with the rate of fueling change up to about 14 mg/sec. However, with a step fueling rate change (e.g. fueling rate changing greater than about 14 mg/sec), the feed forward method requires a slight modification, since the gradient of charge temperature change required for stable combustion during a step fueling transient is much higher than that proven by the initial tests and needs more precise control. It is to be appreciated that the exemplary load transition fueling rate change threshold of substantially 14 mg/sec is merely exemplary and relates to one particular engine. Thus, the actual fueling rate threshold will vary in accordance with the actual engine application including, for example, in accordance with number of cylinders, displacement, vehicle weight, and transmission.

To explain the step change transient effectively, an example is set forth as follows. First, assumed are two operating conditions S1 (low-load) and S2 (high-load), where combustion is stable in steady state. Also, assume that the engine is operating in SI. Since fueling rate is lower in S1, the steady state temperature of the residual gas trapped in the cylinder would be lower than that in S2. Thus, if the fueling rate and all other corresponding inputs change from S1 to S2 in one engine cycle, the temperature of the residual gas trapped in the very next engine cycle would be lower than that required for S2, because the residual gas comes from the previous cycle where the engine was running in S1. As a result, the overall temperature of the cylinder charge would be lower than that required, resulting in retarded combustion phasing (or even partial-burn or misfire). One way to increase the cylinder charge temperature is to trap more residual mass or equivalently, trap less fresh air mass in the cylinder in the very next cycle, causing a richer air-fuel ratio than that required for S2.

A similar idea can be applied to a transition from S2 to S1. Assume that the engine is running in the operating condition S2. If the fueling rate and all other corresponding inputs change from S2 to S1 in one engine cycle, the temperature of the residual gas trapped in very next engine cycle would be higher than that required for S1, resulting in advanced combustion phasing (or even knocking). The cylinder charge temperature can be decreased by trapping less residual mass or, equivalently, trapping more fresh air mass in the cylinder in the very next cycle, causing a leaner air-fuel ratio than that required for S1.

This modification has been validated through tests with a single cylinder engine equipped with a variable valve actuation (VVA), which can emulate a cam-phaser. In the first test, negative valve overlap (NVO) was intentionally delayed or advanced by one or two engine cycles compared with the fueling rate change, to introduce different variations in air-fuel ratio during the transient. The air-fuel ratio was measured at the exit plane of the exhaust port using a fast response O2 sensor with a response time of 0.15 sec. The fueling rate changed from 7 mg/cycle to 12 mg/cycle (and vice versa), in one engine cycle. The engine was fully warmed-up, and the engine speed was maintained at 1000 rpm during the test.

Figure 9:
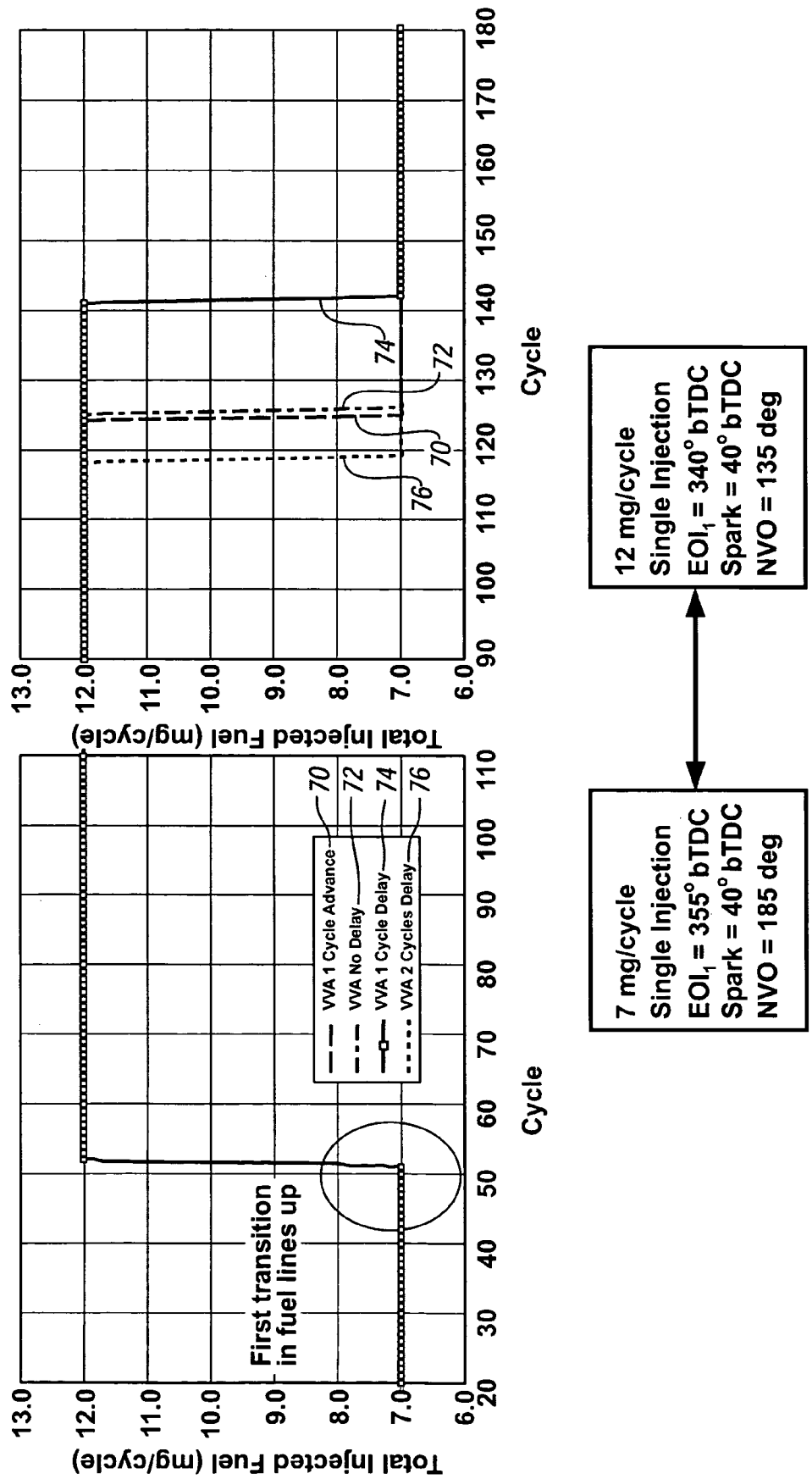
FIG. 9 is a graph of injected fuel mass/cycle vs. engine cycles for a step load transient test having advanced, normal and delayed NVO timing.
Figure 10:
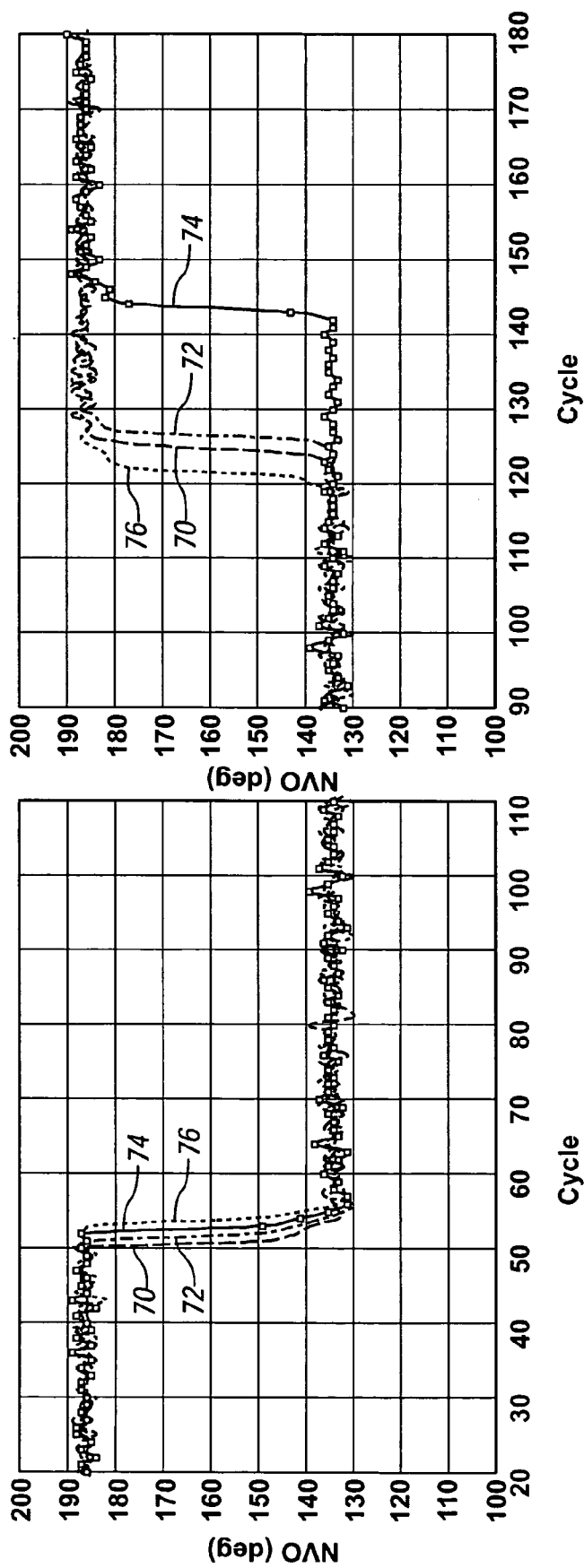
FIG. 10 is a graph of NVO position vs. engine cycles during the load transient test of FIG. 9.

FIGS. 9-12 graph the test results. Four different NVO timing settings relative to fueling change timing were used in four separate runs, which are indicated where significant by numerals 70 (1 cycle advance), 72 (no delay), 74 (1 cycle delay) and 76 (2 cycles delay). Timing of the fuel increase steps is set at cycle 51 but timing of the fuel decrease steps varies and is not significant. FIG. 9 shows the fueling rate changes all occurred immediately within one cycle. FIG. 10 shows the NVO changes, which began on sequential cycles and functioned smoothly during the load transients.

Figure 11:
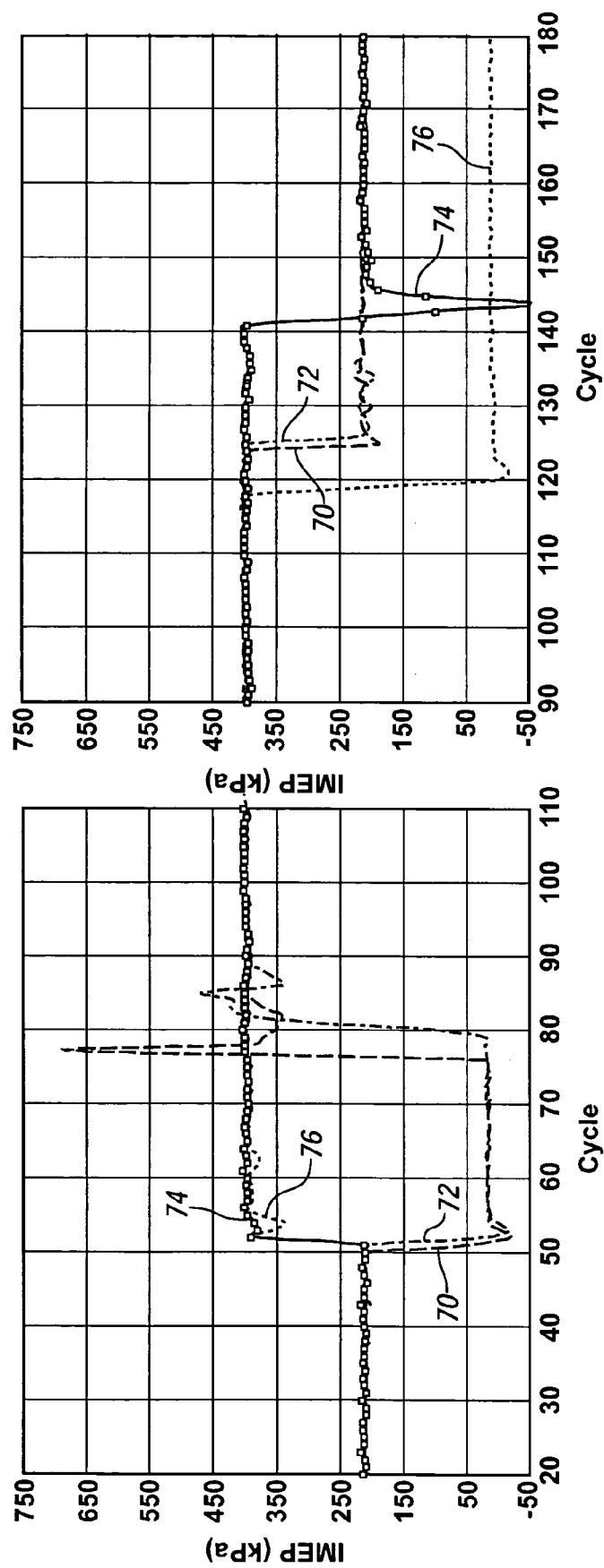
FIG. 11 is a graph of measured IMEP vs. engine cycles during the load transient of FIG. 9.
Figure 12:
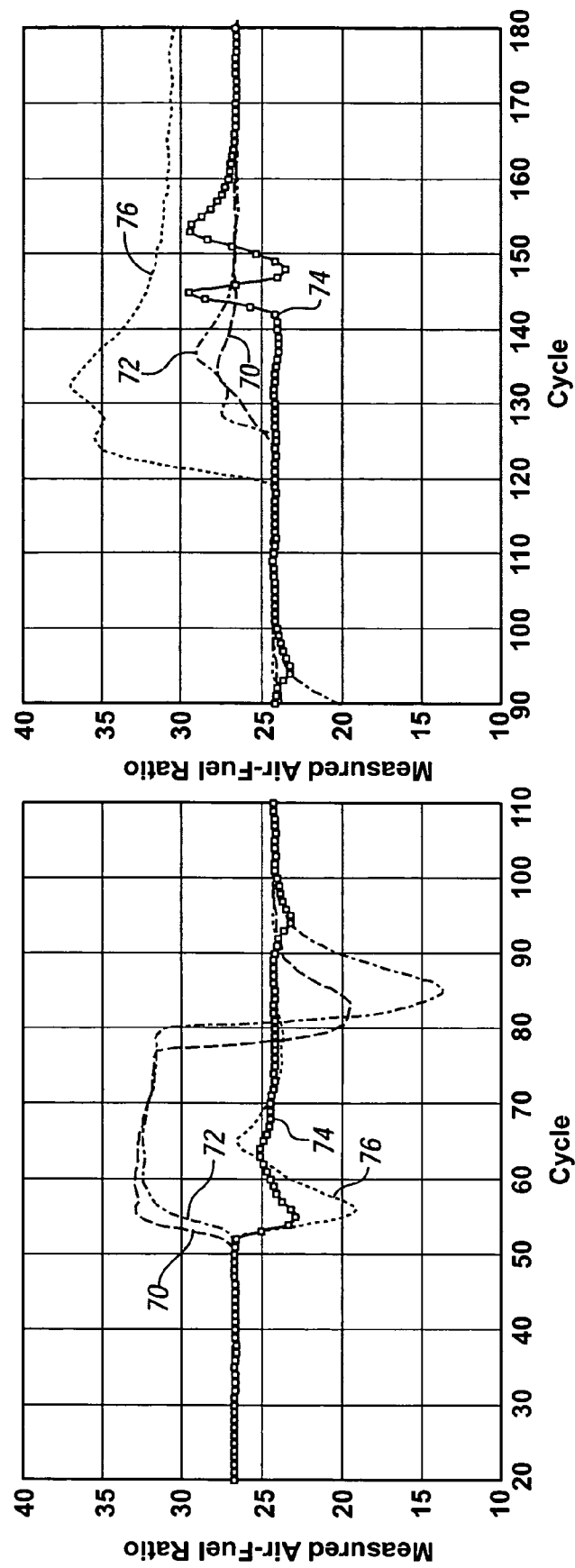
FIG. 12 is a graph of measured air-fuel ratio vs. engine cycles during the load transient test of FIG. 9.

FIG. 11 shows the measured Indicated Mean Effective Pressure (IMEP) variations. The load increase was most stable with NVO at one cycle delay 74 or 2 cycles delay 76. However load decrease was most stable at no delay 72 or 1 cycle advance 70. FIG. 12 shows the measured air-fuel ratio variations of which stability results are similar to those of IMEP. From the figures, it is seen that the combustion can be maintained stable only when the air-fuel ratio is slightly richer during tip-in (fueling rate increase) while slightly leaner during tip-out (fueling rate reduction), as expected from earlier discussion.

In summary, for a fast fueling rate change, such as a step change, it is required to delay NVO by one or more speed dependent engine cycles during tip-in for a satisfactory load transient with the modified method. However, there is no need for delaying NVO during tip-out.

The invention preferably uses variable rate limiters to control the changing rates of inputs to the engine (such as amount of fuel injection and phase of cam, etc.) in order to achieve a richer air-fuel mixture during tip-in, while achieving a leaner air-fuel mixture during tip-out when the requested fuel change rate is faster than about 14 mg/sec. The magnitude of air-fuel ratio deviation from the air-fuel ratio set point during transient is pre-calibrated depending on the driver's load demand and operating condition.

If the requested fuel change rate is slower than about 14 mg/sec, the changes in fueling rate and cam phaser position (NVO setting) are simply synchronized to achieve a smooth air-fuel ratio transition, since the effect of air-fuel ratio deviations on combustion is minimal.

A different example of a special kind of load transient involves a deceleration fuel cut-off (DFCO) and refire. The engine is operated at a fueling rate (load) of 6 mg/cycle for 25 sec. Then the fuel is cut off. After a dwell of about 5 sec, the engine refires with 5 mg/cycle step fuel change, which is near the low load operating limit of the engine. Attempts with varying fuel rate changes during refire all resulted in misfire and partial burns. Tests were conducted with step fuel change during refire using a split fuel injection strategy comprising a first injection just prior to the intake stroke and a second injection late in the compression stroke.

Figure 13:
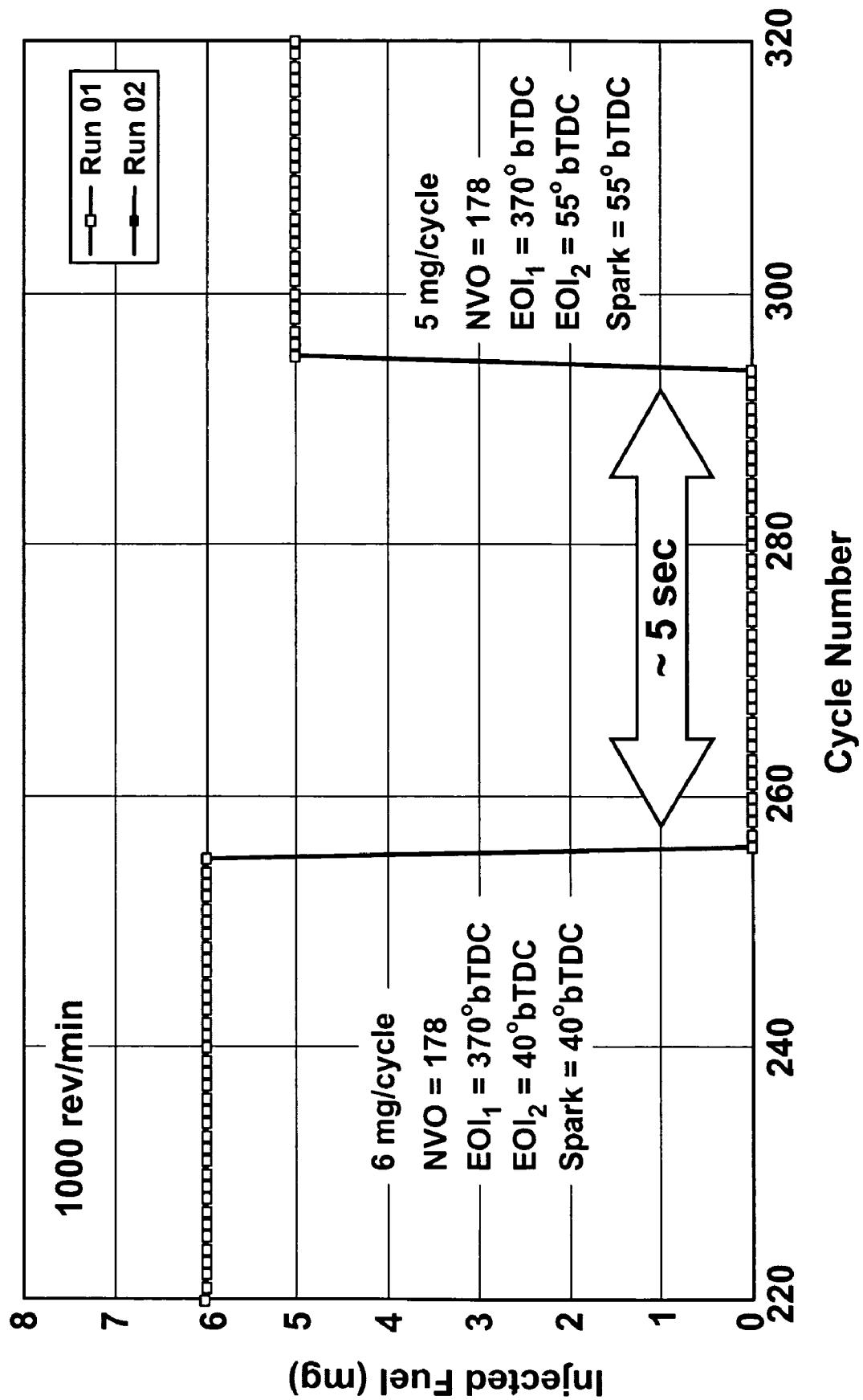
FIG. 13 is a graph of the fuel injection schedule and operating conditions used to simulate deceleration fuel cut-off (DFCO) and refire.
Figure 14:
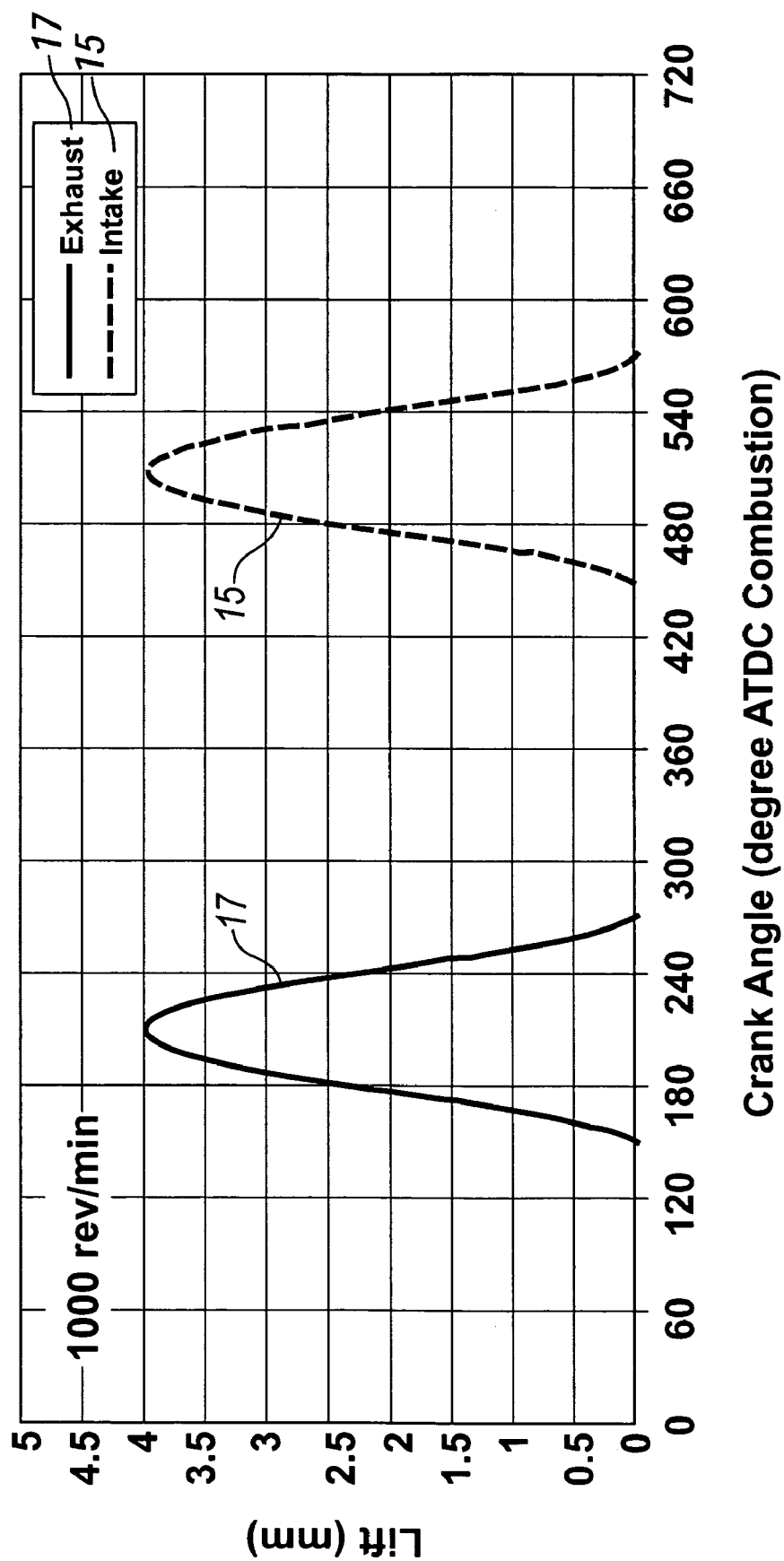
FIG. 14 is a graph of valve lift profiles vs. crank angle used for the DFCO and refire test of FIG. 13.
Figure 15:
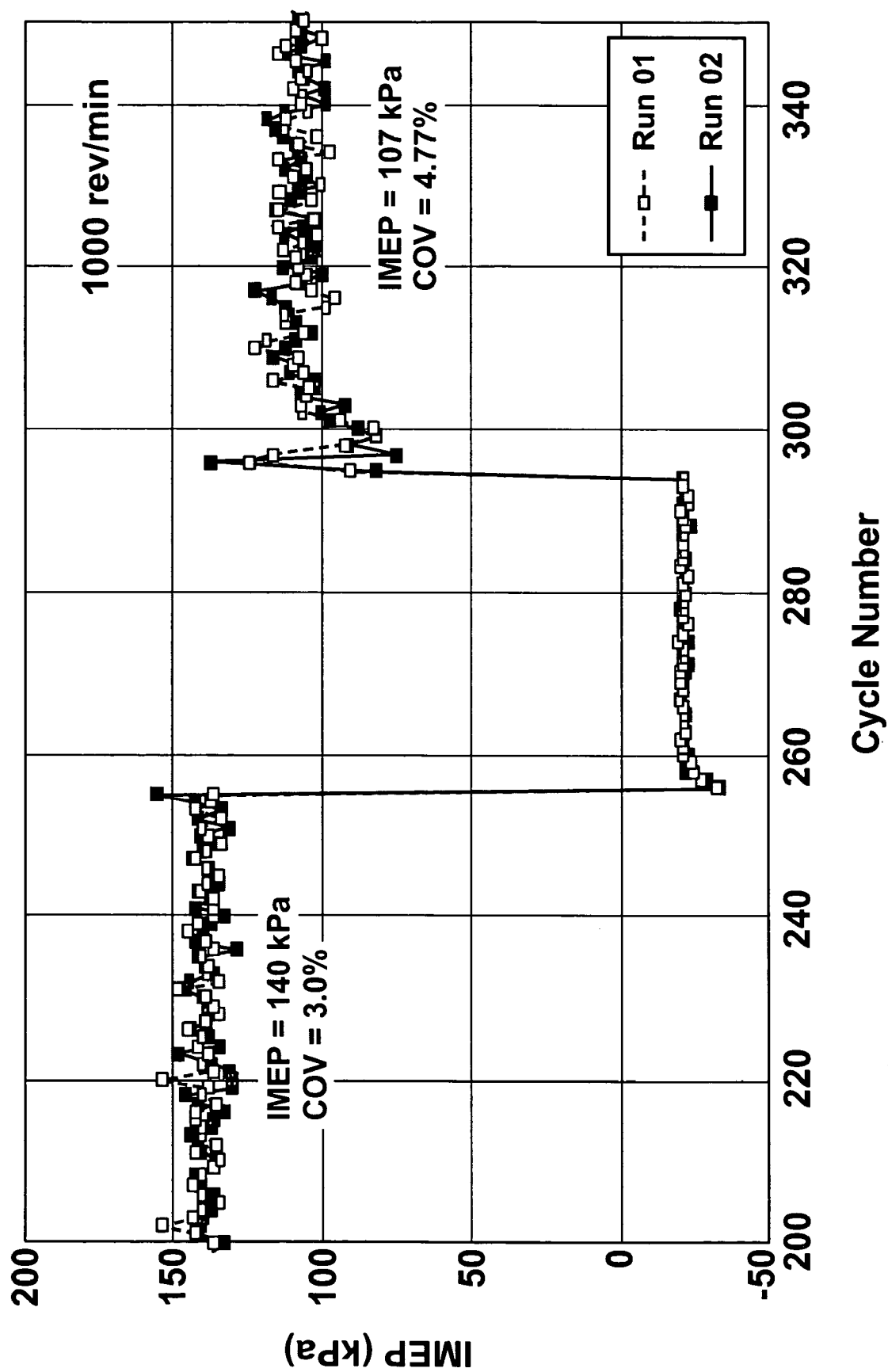
FIG. 15 is a graph of measured IMEP vs. engine cycles during the DFCO and refire of FIG. 13.

FIG. 13 shows the fuel injection schedule and the corresponding engine operating conditions. Note that back-to-back measurements were made to demonstrate the repeatability of the tests. FIG. 14 shows the valve lift profiles used for the DFCO and refire test. Note that the valve lift profiles remain the same during the test. FIG. 15 shows the measured IMEP during the DFCO and refire test. The figure clearly shows successful refire without partial burn or misfire. However, somewhat large IMEP fluctuation is observed immediately after refire.

It should be understood that the broad concepts of the present invention are not limited to use with the exemplary feed forward/feedback control system referred to in the application. Nor is the invention limited to the use of controls based upon lookup tables as discussed herein. Further, for an engine operable in multiple modes of operation over its full operating range, some engine control inputs used in one mode of operation may be inactive in another mode.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for control of a direct-injection controlled auto-ignition lean burn engine during load transient operations, the method comprising:
   operating the engine at steady state, within a homogeneous charge compression-ignition (HCCI) load range, with fuel-air-diluent mixtures at predetermined conditions, for each speed and load, of fueling mass flow rate, injection timing (FI), spark timing (SI) and exhaust recompression obtained by negative valve overlap (NVO) between closing of the exhaust valves and opening of the intake valves in each cylinder; and
   at least one of
      a) controlling the engine during rapid load increase from steady state at lower load to a desired steady state at higher load by synchronizing inputs to the engine, including at least two of FI, SI and NVO, to the current fueling mass flow rate, and
      b) controlling the engine during rapid load decrease from steady state at higher load to a desired steady state at lower load by synchronizing inputs to the engine, including at least two of FI, SI and NVO, to the current fueling mass flow rate.

2. Method as in claim 1 wherein FI, SI, and NVO are all synchronized to the current fueling mass flow rate during at least one of rapid load increase and rapid load decrease.

3. Method as in claim 1 wherein FI, SI, and NVO are all synchronized to the current fueling mass flow rate during rapid load increase.

4. Method as in claim 1 wherein FI, SI, and NVO are all synchronized to the current fueling mass flow rate during rapid load decrease.

5. Method as in claim 1, wherein fast fueling rate changes exceeding a predetermined threshold value are called for, further comprising:
   controlling the engine during a fast load increase to enrich the cylinder air-fuel mixture by providing, during the fast load increase, at least one of
      1) a higher percentage of residual gas, and
      2) a lower percentage of fresh air mass,
      in each cylinder charge, than is required for robust steady state operation of the engine after completion of the fast load change, to provide temperature in the cylinders adequate to auto-ignite the mixture during the increase in fueling mass flow rate, resulting in increased cylinder mixture temperature during the following engine cycles.

6. Method as in claim 5 wherein said higher percentage of residual gas is provided by delaying the called for change in NVO by a speed-dependent number of engine cycles.

7. Method as in claim 1 wherein steady state HCCI engine operations are conducted using variable valve actuation including two-step valve actuation with dual cam phasing.

8. Method for control of a direct-injection controlled auto-ignition engine under stoichiometric operation during load transient operations, the method comprising:
operating the engine at steady state, within a homogeneous charge compression-ignition (HCCI) load range, with fuel-air-diluent mixtures at predetermined conditions, for each speed and load, of fueling mass flow rate, injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder; and at least one of
a) controlling the engine during rapid load increase from a steady state at lower load to a desired steady state at higher load by synchronizing controlled inputs to the engine, including at least three of FI, SI, throttle position, EGR valve setting and NVO, to the current fueling mass flow rate, and
b) controlling the engine during rapid load decrease from a steady state at higher load to a desired steady state at lower load by synchronizing inputs to the engine, including at least three of FI, SI, throttle position, EGR valve selling and NVO, to the current fueling mass flow rate.

9. Method as in claim 8 wherein FI, SI, throttle position, EGR valve setting and NVO are all synchronized to the current fueling mass flow rate during at least one of rapid load increase and rapid load decrease.

10. Method as in claim 8 wherein FI, SI, throttle position, EGR valve setting and NVO are all synchronized to the current fueling mass flow rate during rapid load increase.

11. Method as in claim 8 wherein FI, SI, throttle position, EGR valve setting and NVO are all synchronized to the current fueling mass flow rate during rapid load decrease.

12. Method as in claim 8, wherein fast fueling rate changes exceeding a predetermined threshold value are called for, further comprising:
controlling the engine during a fast load increase to enrich the cylinder air-fuel mixture by providing, during the fast load increase, at least one of
1) a higher percentage of residual gas, and
2) a lower percentage of fresh air mass,
in each cylinder charge, than is required for robust steady state operation of the engine after completion of the fast load increase, to provide temperature in the cylinders adequate to auto-ignite the mixture during the increase in fueling mass flow rate, resulting in increased cylinder mixture temperature during the following engine cycles.

13. Method as in claim 12 wherein said higher percentage of residual gas is provided by delaying the called for change in at least one of NVO, throttle position and EGR valve setting by a speed-dependent number of engine cycles.

14. Method as in claim 8 wherein steady state HCCI engine operations are conducted using variable valve actuation including two-step valve actuation with dual cam phasing.

15. Method for control of a direct-injection controlled auto-ignition engine during load transient operations, the method comprising:
operating the engine at steady state, within a homogeneous charge compression-ignition (HCCI) load range, with fuel-air-diluent mixtures at predetermined conditions, for each speed and load, of fueling mass flow rate, injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder; and at least one of
a) controlling the engine during rapid load increase from a steady state at lower load to a desired steady state at higher load by synchronizing controlled inputs to the engine, including at least three of FI, SI, throttle position, EGR valve setting and NVO, to the current fueling mass flow rate, and
b) controlling the engine during rapid load decrease from a steady state at higher load to a desired steady state at lower load by synchronizing inputs to the engine, including at least three of FI, SI, throttle position, EGR valve selling and NVO, to the current fueling mass flow rate.

16. Method as in claim 15 wherein the engine is operated with lean air-fuel ratios and FI, SI, and NVO are all synchronized to the current fueling mass flow rate during at least one of rapid load increase and rapid load decrease.

17. Method as in claim 16, wherein fast fueling rate changes exceeding a predetermined threshold value are called for, further comprising:
controlling the engine during a fast load increase to enrich the cylinder air-fuel mixture by providing, during the fast load increase, at least one of
1) a higher percentage of residual gas, and
2) a lower percentage of fresh air mass,
in each cylinder charge, than is required for robust steady state operation of the engine after completion of the fast load change, to provide residual exhaust temperature in the cylinders adequate to auto-ignite the mixture during the increase in fueling mass flow rate, resulting in increased exhaust temperature during the following engine cycles.

18. Method as in claim 15 wherein HCCI engine operations are conducted using variable valve actuation including two-step valve actuation with dual cam phasing.

19. Method as in claim 15 wherein the engine is operated with stoichiometric air-fuel ratios and at least FI and SI are synchronized to the current fueling mass flow rate during at least one of rapid load increase and rapid load decrease.

20. Method as in claim 19, wherein fast fueling rate changes exceeding a predetermined threshold value are called for, further comprising:
controlling the engine during a fast load increase to enrich the cylinder air-fuel mixture by providing, during the fast load increase, at least one of
1) a higher percentage of residual gas, and
2) a lower percentage of fresh air mass,
in each cylinder charge, than is required for robust steady state operation of the engine after completion of the fast load increase, to provide temperature in the cylinders adequate to auto-ignite the mixture during the increase in fueling mass flow rate, resulting in increased cylinder mixture temperature during the following engine cycles.

* * * * *